United States Patent [19]

Takeya

[11] Patent Number: 5,390,938
[45] Date of Patent: Feb. 21, 1995

[54] VIDEO GAME APPARATUS

[75] Inventor: Noriyoshi Takeya, Tokorozawa, Japan

[73] Assignees: Pioneer Electronic Corporation, Tokyo; Hudson Soft Co., Ltd., Hokkaido, both of Japan

[21] Appl. No.: 118,624

[22] Filed: Sep. 10, 1993

[30] Foreign Application Priority Data

Sep. 11, 1992 [JP] Japan .................................. 4-243806

[51] Int. Cl.$^6$ .............................................. A63F 9/22
[52] U.S. Cl. ................................................... 273/434
[58] Field of Search ............... 273/DIG. 28, 433, 434, 273/435, 436, 437, 438, 85 G, 148 B

[56] References Cited

U.S. PATENT DOCUMENTS 4,571,640 2/1986 Baer ..................................... 358/342
4,890,833 1/1990 Lantz et al. ......................... 273/437

FOREIGN PATENT DOCUMENTS 4276283 10/1992 Japan ................................... 273/434

OTHER PUBLICATIONS

"Dragon Spirit", Official TurboGraFX-16 Game Encyclopedia, Bantam Books, Nov. 1990, pp. 160-164; particularly p. 164.

Primary Examiner—Jessica J. Harrison
Attorney, Agent, or Firm—Sughrue, Mion, Zinn, Macpeak & Seas

[57] ABSTRACT

A video game apparatus which is designed in such a way that when a game is played to the end and the same game is to be played again, the audio signal channel is switched to a different channel so that an audio signal different from that in the previous game is output.

2 Claims, 5 Drawing Sheets

VIDEO GAME APPARATUS

BACKGROUND OF THE INVENTION

1. Field of the Invention

The present invention relates to a video game apparatus which runs a game program to reproduce audio signals together with video signals.

2. Description of the Related Art

Video game apparatuses can allow players to easily repeat playing the same game. After having played a story-based game to the end, a player may soon try to play the same game again from the beginning. In this case, if the game repeatedly progresses with the same contents in the same sequence, the excitement or enjoyment of the player will be reduced. Game makers therefore try to design games so that the attribute of characters in each game, such as strength, and the locations of items necessary for the progression of each game can be altered every game play.

Due to the limited memory capacity for the game program, however, only simple alteration as mentioned above is not performed, causing players to lose their interest in games.

SUMMARY OF THE INVENTION

It is therefore an object of the present invention to provide a video game apparatus which can prevent a player from losing the player's interest in a game even when the player plays the same game repeatedly.

To achieve the foregoing object, a video game apparatus according to the present invention comprises game control means for executing a game program in order to produce a video signal in accordance with a manipulation; means for simultaneously generating audio signals for a plurality of channels in accordance with the execution of the game program by the game control means; switch signal generating means for detecting that the game control means executes a specific step indicating a game end in the game program, and for generating a switch signal; and switching means for selectively outputting an audio signal of one channel from among audio signals for the plurality of channels in accordance with the switch signal.

According to the video game apparatus of the present invention, when a game is played to the goal and the same game is to be played again, the audio signal channel is switched to a different channel so that an audio signal different from that in the previous game is output.

DETAILED DESCRIPTION OF THE PREFERRED EMBODIMENT

A preferred embodiment of the present invention will now be described referring to the accompanying drawings.

Figure 1:
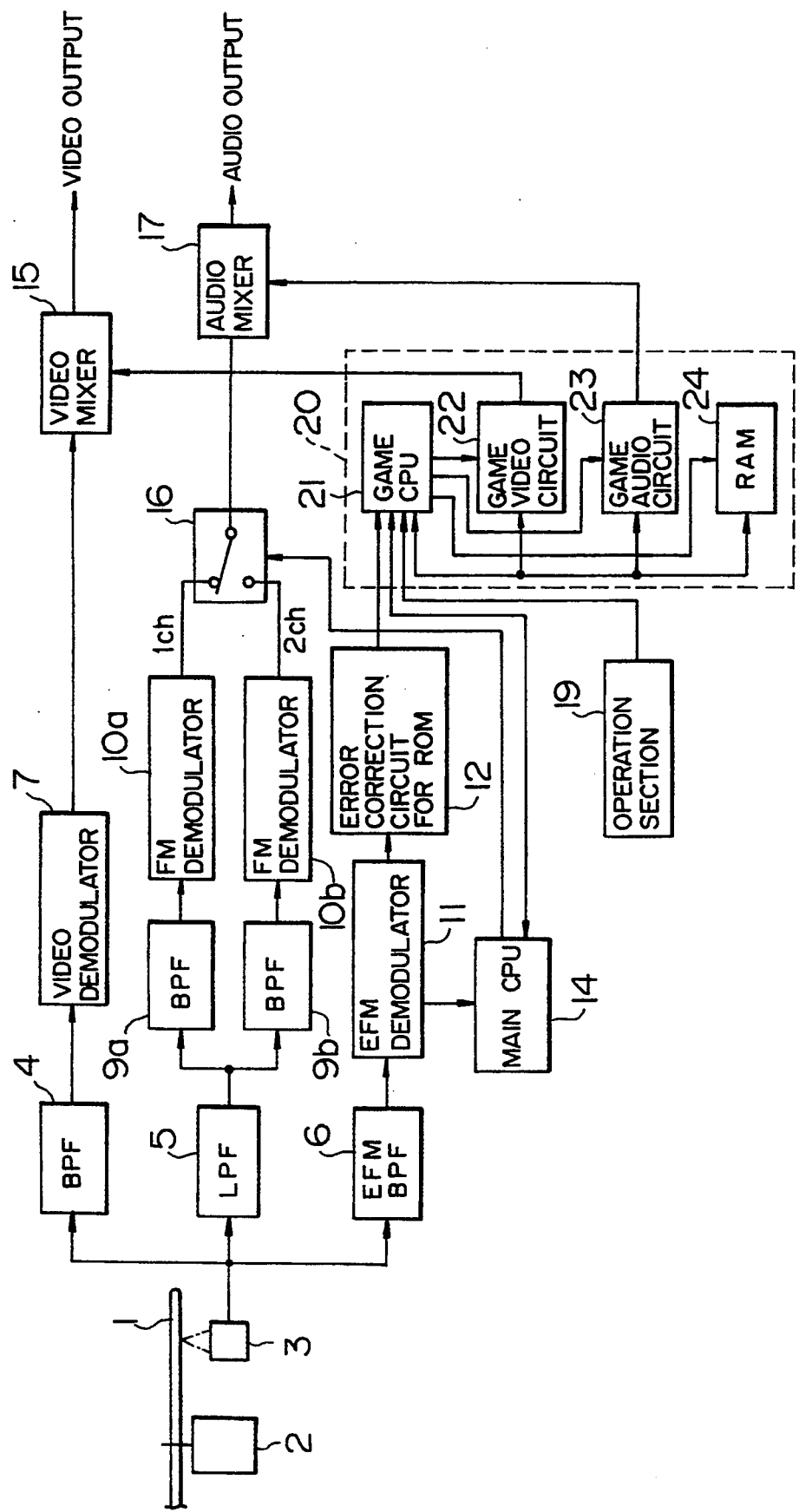
FIG. 1 is a block diagram illustrating one embodiment of the present invention.

In a video game apparatus embodying the present invention as shown in FIG. 1, a disk 1 is called "LD-ROM" on which an analog video signal, analog audio signals for two channels and a digital data signal are recorded in frequency multiplexed manner. The analog video signal represents the background video image of the game or the like, while the analog audio signals of the two channels represent different narrations or background sounds in the same game. The digital data (game information) signal may represent graphics video data, such as characters and letters, or audio data such as effect sounds, besides the game program. The analog video signal and audio signals are FM (Frequency Modulation) signals which have been frequency-modulated, while the digital data signal is an EFM (Eight to Fourteen Modulation) signal which have undergone EFM. The disk 1 is rotated by a spindle motor 2 and information recorded on the disk 1 is read by a pickup 3. The output signal of the pickup 3, an RF (radio frequency) signal, is supplied to a band-pass filter (BPF) 4 for video signals, a low-pass filter (LPF) 5 for analog audio signals and a band-pass filter 6 for EFM data signals.

The passband of the band-pass filter 4 is determined in accordance with the frequency band (e.g., 3.5 to 15 MHz) of a transmission channel for FM video signals. The FM video signal that has passed through the band-pass filter 4 is supplied to a video demodulator 7 where it is demodulated to be a video signal. This video signal is output via a video mixer 15.

The signal that has passed the low-pass filter 5 is separated into FM audio signals of two channels by band-pass filters 9a and 9b, which pass only 2.3-MHz and 2.8-MHz audio carrier components, for example. The FM audio signals are respectively supplied to FM demodulators 10a and 10b and are demodulated to be audio outputs of the two channels. The outputs of the FM demodulators 10a and 10b are connected to a switch 16 which selectively outputs one of the demodulated audio signals of the two channels to an audio mixer 17.

The low-pass filter 6 for digital EFM signals is designed to pass a signal of 2 MHz or below, for example. The EFM signal that is separated from the reproduced RF signal by the low-pass filter 6 is demodulated by an EFM demodulator 11. The demodulated signal is then supplied as data to an error correction circuit 12 for ROM. The error correction circuit 12 performs an error correction on the game information supplied from the EFM demodulator 11.

The LD-ROM contains TOC (Table Of Contents) information recorded as a subcode Q in its lead-in area.

Figure 2:
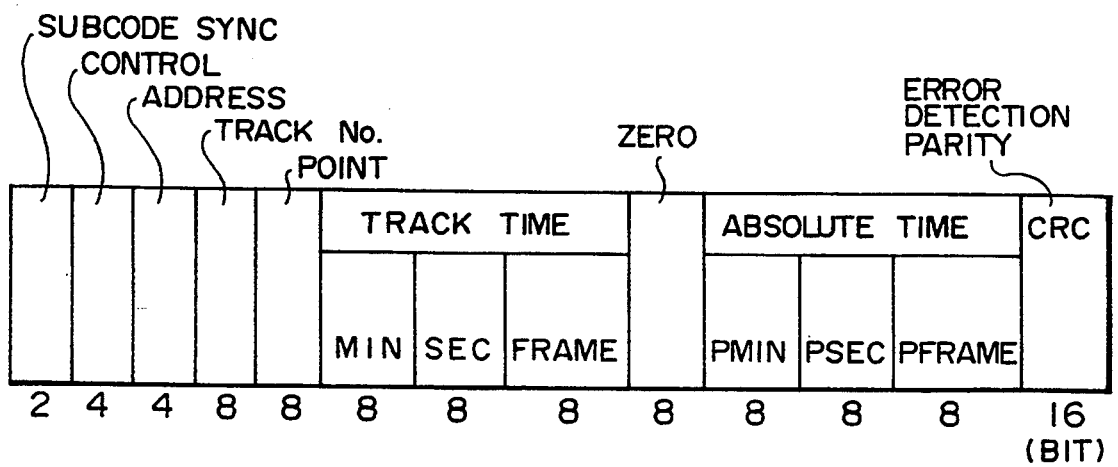
FIG. 2 is a diagram showing the format of a subcode Q signal.

Identification information indicating that the LD-ROM contains a digital EFM signal is included in the TOC information. The format of the subcode Q signal constituting the TOC information is exemplified as for one subcode frame (98 frames) in FIG. 2. The format will now be briefly described. The format starts with a subcode sync portion for frames 0 and 1, which is followed by a control portion having four bits. When the control portion is "01X1", it indicates "LD-ROM" where X may be either 0 or 1. The control portion is followed in order of a track time portion, a zero portion, an absolute time portion and an error detection parity portion. The point portion having eight bits indicates what the absolute time, PMIN, PSEC and PRAME, represents. For instance, when the point portion is "00000001", it indicates the start time of track number 1. The track time, MIN, SEC and FRAME, indicates the time in each track on the disk 1.

The TOC information is separated by the EFM demodulator 11 and is supplied to a main CPU 14. The CPU 14 controls the operation of the disk player including the servo system in response to various instructions from a game CPU 21 which will be described shortly after.

The output of the error correction circuit 12 for ROM is connected to a game block 20. The game block 20 comprises the game CPU 21, a game video circuit 22, a game audio circuit 23 and a RAM 24. The game CPU 21 has a ROM (not shown) in which a basic program for running the game program is previously stored. The CPU 21 receives error-corrected data from the error correction circuit 12, and controls the game video circuit 22, game audio circuit 23 and RAM 24 in accordance with the basic program which is stored in the internal ROM for controlling game information, and the manipulation of an operation section 19, which will be described later. The CPU 21 also supplies data to those circuits 22, 23 and RAM 24. The CPU 21, game video circuit 22, game audio circuit 23 and RAM 24 are connected to each other by a common data bus. Further, control signal lines from the CPU 21 are respectively connected to the game video circuit 22, game audio circuit 23 and RAM 24.

Instructions and data are exchanged between the CPU 21 and CPU 14. The game video circuit 22 receives graphics video data from the CPU 21, converts the received graphics video data into an analog graphics video signal in accordance with a control signal, and sends the analog signal to the video mixer 15. The video mixer 15 has a superimpose function to mix the graphics video signal into the video signal that is output from the video demodulator 7. The superimposed video signal is supplied to a CRT display (not shown). The game audio circuit 23 receives audio data from the CPU 21, converts the audio data into an analog audio signal in accordance with a control signal, and sends the analog signal to the audio mixer 17. The audio mixer 17 simply adds the received audio signals to mix them.

The operation section 19 is connected to the CPU 21, and has keys, such as a start key and cursor keys, to progress a game.

A description will now be given of the operation of the thus constituted apparatus of the present invention at the time a game is played. It is assumed that the disk 1 has already been placed at a predetermined position where it can be rotated by the spindle motor 2.

Figure 3:
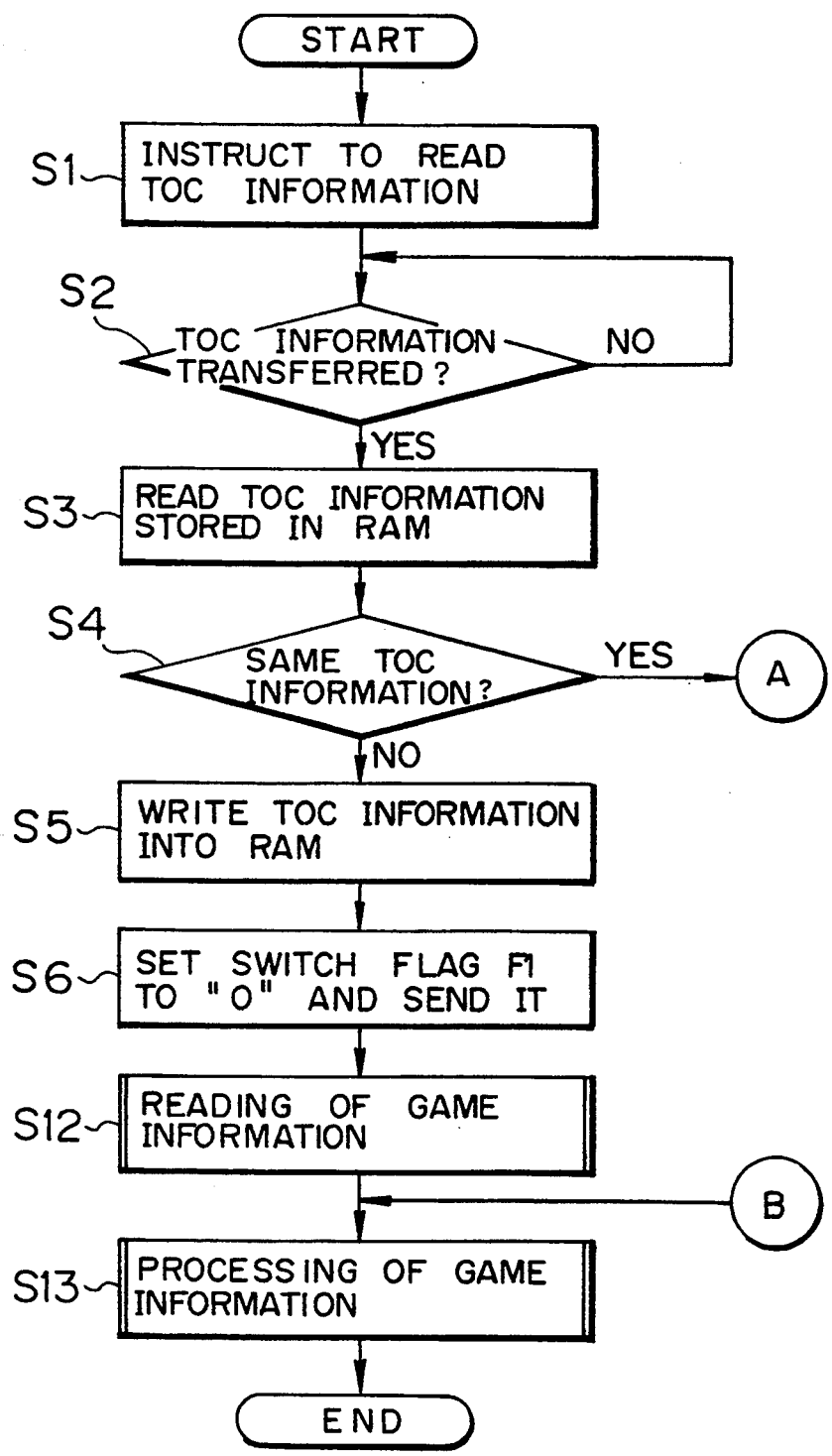
FIG. 3 is a flowchart illustrating the operation of a game CPU.

When the start key on the operation section 19 is operated, a game start instruction is supplied to the CPU 21, and then the CPU 21 instructs the CPU 14 to read the TOC information (step S1), as shown in FIG. 3.

Figure 5:
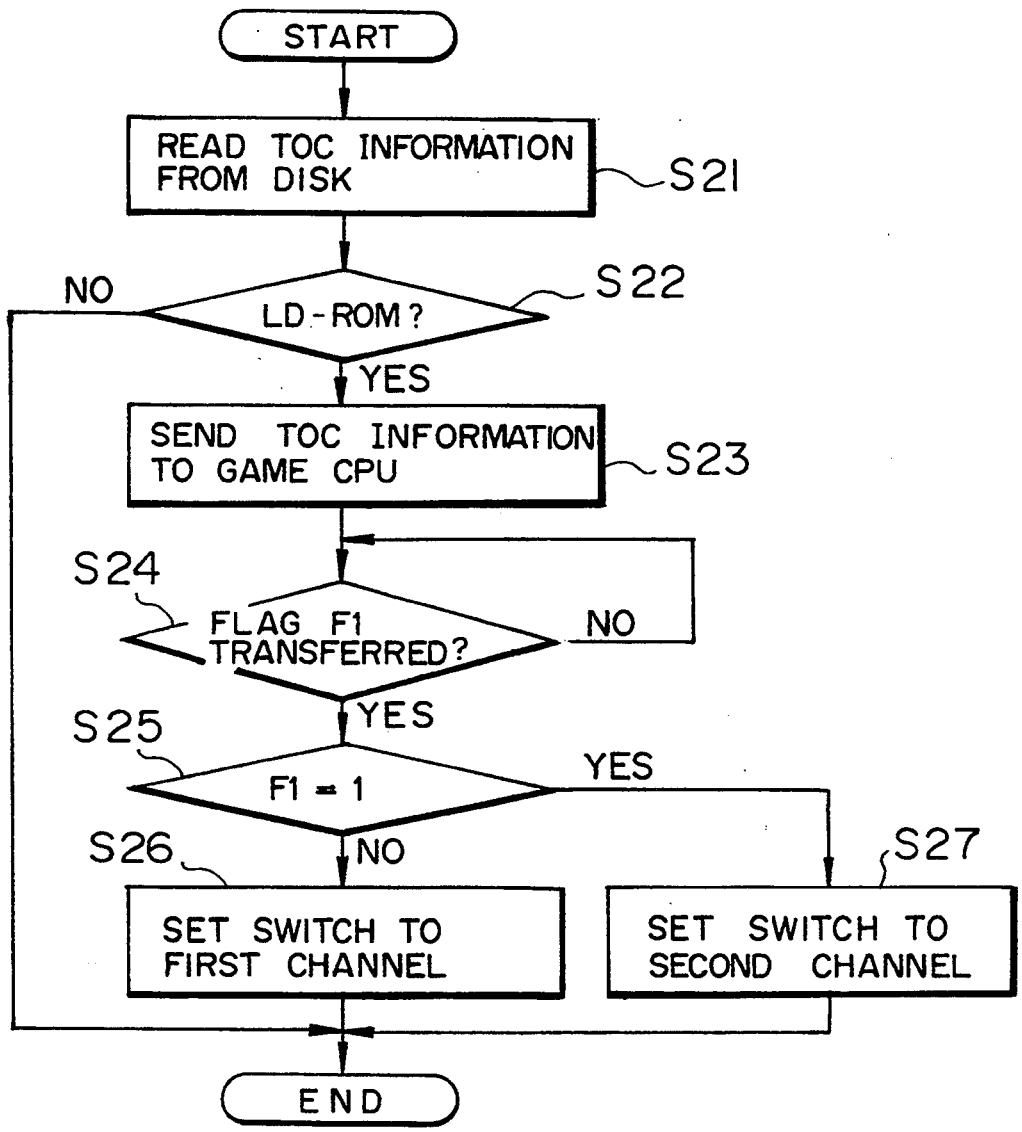
FIG. 5 is a flowchart illustrating the operation of a main CPU.

In response to the TOC-information read instruction, first, the CPU 14 reads the TOC information from the lead-in area on the disk 1 (step S21) as shown in FIG. 5. The CPU 14 determines whether or not the disk 1 is a LD-ROM from the read TOC information (step S22). More specifically, the CPU 14 determines the disk 1 as a LD-ROM when the control portion having four bits is "01X1," and not as a LD-ROM when the control portion is other than the code. When the disk 1 is not a LD-ROM, this routine will be terminated since it is impossible to start the game. When the disk 1 is a LD-ROM, the CPU 14 transfers the read TOC information to the CPU 21 in the game block 20 (step S23).

Figure 4:
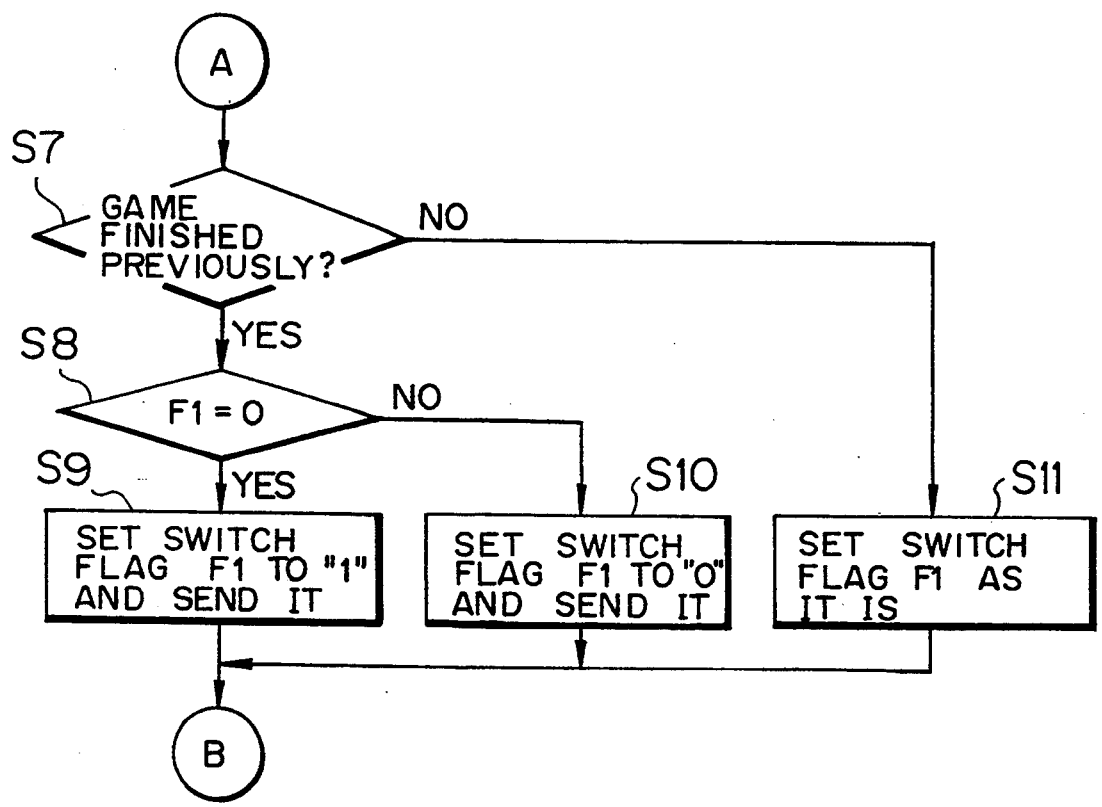
FIG. 4 is a flowchart illustrating the continuation of the operation of a game CPU.

The CPU 21 determines if the TOC information has been transferred from the CPU 14 (step S2). If the TOC information has been sent from the CPU 14, the CPU 21 reads the TOC information which has already been stored in the RAM 24 (step S3), and determines if the transferred TOC information matches with the read one (step S4). If both TOC information do not match with each other, the CPU 21 writes the transferred TOC information into the RAM 24 (step S5). In this case, the present game differs from the previously played game, so that the CPU 21 resets the switch flag F1 to "0" and sends it to the CPU 14 (step S6). If the transferred TOC information is the same as the read one, on the other hand, the CPU 21 determines if the game has been played to the end in the previous play (step S7) as shown in FIG. 4. If the game has been played to the end (goal), the game end flag F2 should have been set to "1" and should be stored in the RAM 24. If the game end flag F2 is equal to "1", the CPU 21 determines whether or not the switch flag F1 is "0" (step S8). When F1=0, the CPU 21 sets the switch flag F1 to "1" and transfers it to the CPU 14 (step S9). When F1=1, which means that it is not the first time the game has been completed, the CPU 21 resets the switch flag F1 to "0" as done in step S6, and transfers it to the CPU 14 (step S10). When the game is not played to the end and the game end flag F2 is equal to "0" in step S7, the CPU 21 transfers the switch flag F1 as it is, to the CPU 14 (step S11).

When no TOC information has been transferred in step S2, this step S2 is repeated. If the disk 1 is not judged as a LD-ROM in step S22, the TOC information is not transferred from the CPU 14, so that the CPU 21 may terminate this routine when the state of no TOC information having transferred continues more than a predetermined period. Further, if the disk 1 is not judged as a LD-ROM in step S22, the CPU 14 may transfer the information indicating no LD-ROM to the CPU 21 so that the CPU 21 can terminate this routine in accordance with that information.

After executing step S23, the CPU 14 determines if the switch flag F1 has been sent from the CPU 21 (step S24). When the switch flag F1 is received by the CPU 14, the CPU 14 determines if the received flag F1 is equal to "1" (step S25). When F1=0, the CPU 14 controls the switch 16 to select the first channel (1ch) (step S26). When F1=1, the CPU 14 controls the switch 16 to select the second channel (2ch) (step S27). When the switch 16 is set for the first channel, the output audio signal of the FM demodulator 10a is output via the audio mixer 17. On the other hand, When the switch 16 set for the second channel, the output audio signal of the FM demodulator 10b is output via the audio mixer 17.

After executing step S6, the CPU 21 executes an operation to read game information (step S12). In this operation, the CPU 21 designates the game-information reading position on the disk 1 to the CPU 14, and then causes the pickup 3 to pickup the game information from the reading position on the disk 1 and transfers the read game information to the CPU 21 via the filter 6, EFM demodulator 11 and error correction circuit 12. When the game information is received by the CPU 21, the CPU 21 writes the game information in the RAM 24. After the game-information reading operation is executed, the CPU 21 processes the game information (step S13). If any of steps S9 to S11 is executed, the CPU 21 immediately goes to step S13.

During the processing of the game information, the CPU 21 designates the reading position on the disk 1 to the CPU 14, and the CPU 14 controls the reading of information from the designated reading position on the disk 1. The video signal component in the RF signal read by the pickup 3 is supplied via the band-pass filter 4 to the video demodulator 7 and is demodulated there to be a video signal. The audio signal component of the first channel in the read RF signal is converted into analog audio signal by the low-pass filter 5, band-pass filter 9a and FM demodulator 10a, and the audio signal component of the second channel in the read RF signal is converted into analog audio signal by the low-pass filter 5, band-pass filter 9b and FM demodulator 10b. The data signal component in the read RF signal is supplied via the low-pass filter 6 to the EFM demodulator 11 and is demodulated there to be a data output. The data output is subjected to error correction in the error correcting circuit 12 before being sent to the CPU 21. The CPU 21 performs data processing in accordance with the game program and the key operation on the operation section 19, and supplies the graphics video data to the game video circuit 22 while supplying the audio data to the game audio circuit 23. In the game video circuit 22, the video data is converted into an analog graphics video signal. The video mixer 15 normally outputs the analog video signal output from the video demodulator 7. When the graphics video signal is output from the game video circuit 22, however, the video mixer 15 either outputs the graphics video signal by priority, or combines the analog video signal and the graphics video signal at a mixing ratio included in the game program under the control of the game CPU 21 and then outputs the combined signals. In the game audio circuit 23, the audio data is converted into an analog audio signal.

When the switch 16 is set for the first channel, the analog audio signal of the first channel output from the FM demodulator 10a is supplied via the switch 16 to the audio mixer 17. When the switch 16 is set for the second channel, on the other hand, the analog audio signal of the second channel output from the FM demodulator 10b is supplied via the switch 16 to the audio mixer 17. Normally, the audio mixer 17 directly outputs the audio signal selectively relayed from the switch 16. When the audio signal is output from the game audio circuit 23, the audio mixer 17 mixes the audio signal from the game audio circuit 23 with the audio signal from the switch 16, and outputs the mixed audio signal.

Figure 6:
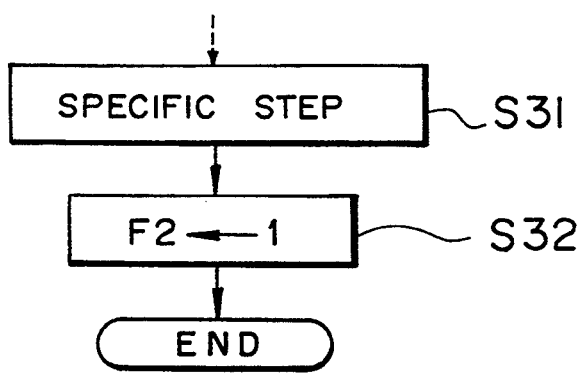
FIG. 6 is a flowchart illustrating a part of a game program.

After executing a specific step S31 in the game program, to which the CPU 21 advances when the game is played to the end, the CPU 21 sets the game end flag F2 to "1" and stores it together with the TOC information in the RAM 24 in the subsequent step S32 as shown in FIG. 6. As the game end flag F2 is set, it is possible to determine in the aforementioned step S7 if the game has been finished previously. When the transferred TOC information does not match with the read one in step S4, the game end flag F2 is reset to "0." The TOC information associated with a plurality of disks for games and the game end flag F2 are stored as pairs in the RAM 24.

While the game block 20 is included in the main body in the illustrated example, the circuit portion of the game block 20 may be designed attachable to and detachable from the main body.

Although there are audio signals of two channels in the above-described embodiment, the number of channels is not limited to two but may of course be three or greater. The conventional scheme of changing the order of programmed sounds or the strength of characters during playing a game may also be employed in the present invention.

In the above-described embodiment, it is determined from TOC information if the present game is the same as the previous game. Such a decision is unnecessary in a video game apparatus which plays only a single game.

According to the video game apparatus of the present invention, as described above, when a game is played to the end and the same game is to be played again, the audio signal channel is switched to a different channel so that an audio signal different from that in the previous game is output. If different narrations or sounds are assigned to different channels, therefore, a player can enjoy the game without losing interest even when the same game is played again.

What is claimed is:

1. A video game apparatus comprising:
    game control means for executing a game program in order to produce a video signal in accordance with a manipulation;
    means for simultaneously generating audio signals for a plurality of channels in accordance with the execution of said game program by said game control means;
    switch signal generating means for detecting that said game control means executes a specific step in said game program, and for generating a switch signal in response to said detecting;
    switching means for selectively outputting an audio signal of one channel from among audio signals for said plurality of channels in accordance with said switch signal; and
    judging means for determining if a present game program to be executed by said game control means is the same as a last game program executed by said game control means,
    wherein said switch signal generating means functions only when said judging means determines that the present game program is the same as the last executed game program.

2. A video game apparatus comprising:
    game control means for executing a game program in order to produce a video signal in accordance with a manipulation;
    means for simultaneously generating audio signals for a plurality of channels in accordance with the execution of said game program by said game control means;
    switch signal generating means for detecting that said game control means executes a specific step in said game program, and for generating a switch signal every time execution of said specific step in said executed game program by said game control means is detected;
    switching means for selectively outputting an audio signal of one channel from among audio signals for said plurality of channels in accordance with said switch signal; and
    judging means for determining if a present game program to be executed by said game control means is the same as a last game program executed by said game control means,
    wherein said switch signal generating means functions only when said judging means determines that the present game program is the same as the last executed game program.

* * * * *